United States Patent

Zackovich

[11] Patent Number: 5,988,974
[45] Date of Patent: Nov. 23, 1999

[54] VEHICLE LIFTING AND TOWING APPARATUS

[76] Inventor: Stanley E. Zackovich, 409 Floral Ave., Cle Elum, Wash. 98922

[21] Appl. No.: 08/820,878

[22] Filed: Mar. 21, 1997

[51] Int. Cl.⁶ ....................................................... B60P 3/12
[52] U.S. Cl. ............................. 414/563; 280/402; 414/800
[58] Field of Search .................................. 414/563, 426, 414/800; 280/402

[56] References Cited

U.S. PATENT DOCUMENTS

| | | | |
|---|---|---|---|
| 2,183,478 | 12/1939 | Holmes et al. | 414/563 |
| 3,182,829 | 5/1965 | Wagner | 414/563 |
| 3,871,535 | 3/1975 | Fenske | 414/563 |
| 3,897,879 | 8/1975 | Bubik | 414/563 |
| 3,924,763 | 12/1975 | Pigeon | 414/563 |
| 4,000,823 | 1/1977 | Aquila | 414/563 |
| 4,034,873 | 7/1977 | Haring | 414/563 |
| 4,186,938 | 2/1980 | Youngblood | 280/402 |
| 4,383,807 | 5/1983 | Bubik | 414/563 |
| 4,384,817 | 5/1983 | Peterson | 414/563 |
| 4,451,193 | 5/1984 | Cannon, Jr. et al. | 414/563 |
| 4,473,237 | 9/1984 | Lind | 280/402 |
| 4,473,334 | 9/1984 | Brown | 414/563 |
| 4,564,207 | 1/1986 | Russ et al. | 280/402 |
| 4,573,857 | 3/1986 | Porter, Sr. et al. | 414/563 |
| 4,632,629 | 12/1986 | Kooima | 414/563 |
| 4,634,337 | 1/1987 | Hamman | 414/563 |
| 4,674,943 | 6/1987 | Nespor | 414/563 |
| 4,678,392 | 7/1987 | Capers et al. | 414/563 |
| 4,679,978 | 7/1987 | Holmes et al. | 414/563 |
| 4,737,066 | 4/1988 | Allison, Jr. | 414/563 |
| 4,775,285 | 10/1988 | Zackovich | 414/563 |
| 4,797,057 | 1/1989 | Shoup et al. | 414/563 |
| 4,797,058 | 1/1989 | Bilas | 414/563 |
| 4,836,737 | 6/1989 | Holmes et al. | 414/563 |
| 4,927,315 | 5/1990 | Nespor | 414/563 |
| 4,986,720 | 1/1991 | Holmes et al. | 414/563 |
| 5,391,044 | 2/1995 | Young | 414/563 |

FOREIGN PATENT DOCUMENTS

| | | | |
|---|---|---|---|
| 132435 | 5/1989 | Japan | 280/402 |
| 438044 | 11/1967 | Sweden | 280/402 |
| 1407262 | 9/1975 | United Kingdom | 280/402 |

*Primary Examiner*—David A. Bucci
*Attorney, Agent, or Firm*—Stratton Ballew

[57] ABSTRACT

A vehicle lifting and towing apparatus is provided. The disclosure includes a transverse beam articulatably mountable to a tow vehicle, the transverse beam has the ability to be positioned beneath a separated pair of wheels that are attached to a vehicle. Each end of the transverse beam is received into a middle socket of a carriage. Each carriage includes a fore-socket and a rear-socket. Four tire arms are provided that are manually insertable into the fore-socket and rear-socket of each carriage. The tire arm can also be manually inserted into the sockets of each carriage. Each carriage is positioned proximate an interior facing sidewall of each separated wheel and each tire arm is positioned proximate an edge of each wheel's ground contact. Each pair of tire arms are together able to support at least a single wheel. The transverse bar is raised to contact the tread surface of each of the wheels with the respective tire arms, and further raised to lift the separated pair of wheels and the attached vehicle.

3 Claims, 4 Drawing Sheets

VEHICLE LIFTING AND TOWING APPARATUS

TECHNICAL FIELD

The invention relates to an apparatus for lifting and towing a wheeled vehicle, and more particularly to an apparatus for lifting and towing wheeled vehicles that is especially suited for attachment to a tow vehicle such as a tow truck.

BACKGROUND OF THE INVENTION

Tow trucks equipped with mechanisms for the recovery and transport of vehicles are well known in the vehicle towing industry. A wide variety of mechanisms have been developed to accomplish the towing of disabled or improperly parked vehicles with some success. One goal of a tow truck's lifting mechanism is to lift an end of a vehicle and enable its transport without damage to the vehicle. The simple, reliable and damage-free towing of a vehicle requires a mechanism engineered to accommodate a wide range of vehicle configurations.

A wheel lift is a category of vehicle lifting mechanisms that has proven to be effective for lifting and towing vehicles. The wheel is a point of potential attachment common to all wheeled vehicles. Wheel lift mechanisms typically attach to the wheels of a vehicle to be towed rather than the frame or undercarriage of the vehicle. The wheel is a desirable point of attachment and support for a vehicle because the vehicle's wheel suspension helps to smoothly transport the vehicle. The wheel is also a strong site for lifting, and similarly configured for most vehicles. Vehicles with contemporary styling often include air dams and ground effect packages that protrude down from the front of the vehicle. Lifting and towing such vehicles without damage to these undercarriage components creates difficulties. Wheel lift mechanisms attempt to overcome these difficulties by avoiding the fragile undercarriage components.

A conventional wheel lift mechanism that is successful utilizes an armature positioned beneath the vehicle and between a paired set of wheels that are mounted on the same axle. The wheels on both sides of the vehicle are supported from the armature positioned beneath the vehicle. This configuration is known as an internal wheel lift. U.S. Pat. No. 4,473,334 to Brown describes an outwardly directed U-shaped claw assembly that typifies the internal wheel lift.

The present invention is an improved internal wheel lift mechanism. A shortcoming in current tow truck mounted internal wheel lifting and towing mechanisms is the frequent damage incurred to undercarriages of vehicles during the lifting and towing process. Much of this damage is incurred during the attachment of the internal wheel lift to the vehicle. Punctured tires frequently result from improperly retaining a wheel, especially when hydraulic actuators as taught by Brown '334 are utilized to force the engagement of the wheels to be lifted. The Brown '334 patent also describes a pair of claws with prongs that are positioned to lift the wheels of a vehicle. The inventor of the present invention has discovered that if claws, tines, prongs or armatures are forced into the sidewall of a tire, damage to the tire frequently occurs, especially when the tire is tubeless as usually encountered, or the tire is already flat, as is often encountered. Therefore, a need exists for an internal wheel lift mechanism that retains the wheels of the towed vehicle without employing a locating and positioning means that potentially levers a mechanically powered claw, prong, boom or armature into the tire sidewall of the wheeled vehicle to be towed.

The operator of an internal wheel lift must retain the wheels of the vehicle to be towed with precision. Powered or hydraulic mechanisms often result in damage to the vehicle to be towed, simply as a result of the operator not being aware that there is damage occurring as the powered mechanism engages the vehicle. Also problem with existing internal wheel lift mechanisms is that they fail to allow the operator to directly and manually adjust the wheel lift mechanism to compensate for the variety of wheel diameters typically encountered, especially after the wheel lift mechanism has been initially positioned beneath the vehicle to be towed. Additionally, when the separated pairs of wheels are flat, as typically encountered after accidents and mishaps, hydraulic actuators acting in unison upon both sides of an apparatus are typically unable to compensate for imbalanced or asymmetric wheel configurations in which one of the vehicle's tires is missing of flat while the opposite tire is still intact and properly inflated.

Importantly, hydraulic or powered mechanisms significantly add to the expense and weight of the wheel lift mechanism. Specifically, FIG. 15 of the U.S. Pat. No. 4,473,334 to Brown shows the complex mechanism for expanding and retracting the wheel lift that includes hydraulic actuators mounted within telescoping support members. Hydraulic actuators are undesirable if they can be eliminated by simple manual mechanisms. This is attributable to the high expense of manufacturing, operating and maintaining hydraulic mechanisms, especially in the harsh environments in which many tow trucks must operate.

In another patent disclosure, the U.S. Pat. No. 4,573,857 to Porter, Sr. et al. shows a wheel supporting apparatus incorporated into a vehicle towing mechanism that includes a pair of L-shaped wheel engaging devices, each positioned at an end of a crossbar. The wheel engaging devices each have a rotating section and a fixed section. The rotating sections are hydraulically powered pivot to engage the wheels, after the crossbar is first positioned to place the fixed sections on the wheels of the towed vehicle.

Therefore, a need exists for an internal wheel lift mechanism that allows the operator to manually implement the positioning of the wheel lift mechanism to eliminate unnecessary powered actuators and additionally aid in compensating the wheel lift mechanism's configuration to accommodate a variety of wheel diameters.

Tow trucks are typically retro-fitted with lift mechanisms. Typically, the lift mechanism of a tow truck includes an extendable boom that can also be raised and lowered. The industry standard includes hydraulic actuation to achieve the required boom articulation. A transverse beam or crossbar mounted to the end of the boom is also a typical feature of tow trucks with wheel lifts. The transverse beam is typically pivotable and often hydraulically, to allow the operator to align the transverse beam with the wheels of a vehicle. The customizing of a lift mechanism is a difficult task, requiring expert technicians. To simplify the installation and retrofitting of a tow truck with the lift mechanism, the wheel lift mechanism must be compact and also accommodate the frame configuration of the tow truck which includes a boom and a transverse beam.

Prior wheel lift mechanisms fail to provide a configuration that is easily retrofitted to the standard lifting mechanism found in tow trucks. Therefore, a need exists for a lift mechanism that accommodates the boom and transverse bar configuration of a typical tow truck and is especially suited for a retro-fit installation.

SUMMARY OF THE INVENTION

According to the invention, an apparatus for a vehicle lifting mechanism is provided. The mechanism is especially suited for mounting on a tow truck. The invention comprises a transverse beam articulatably mountable to a tow vehicle that includes an improved wheel lift assembly. The transverse beam has the ability to be positioned beneath a separated pair of wheels that are attached to a vehicle. The separated pair of wheels at least comprise two separated wheels. One end of the transverse beam is received into a middle socket located on the interior face of a carriage. The carriage also includes a fore-socket and a rear-socket. The other end of the transverse beam is received into a middle socket located on the interior face of another carriage. Four tire arms are provided, a fore-arm and a rear-arm are manually insertable into the corresponding fore-socket and rear-socket of each carriage. A rear manual means is also provided for manually inserting the rear-arm into the rear-socket of each carriage. A positioning means is provided for positioning each carriage proximate an interior facing sidewall of each wheel of the separated pair, and for positioning each rear arm proximate a rear edge of each wheel's ground contact. A fore manual means is additionally provided that is effective upon the positioning of each carriage proximate the interior facing sidewall of the respective wheels, for manually inserting the fore-arms into the fore-sockets of the respective carriages and for positioning each of the fore-arms proximate the fore-edges of the ground contacts of each wheel. A fore-arm and rear-arm in combination inserted into the fore-socket and rear-socket of the carriage, support a wheel of the separated pair of wheels. Also additionally, a lifting means is provided for raising the transverse bar to contact the tread surface of each of the wheels with the respective fore-arms that are proximate the fore-edges of each wheel's ground contact and for raising the transverse bar to contact both of the first rear-arms that are proximate the first rear-edge, and for further raising the transverse bar to lift the separated pair of wheels and the attached vehicle.

Manual selection and insertion of the tire arms results in a safe and sure wheel lift assembly that is less expensive to build, operate and maintain when compared to similarly utilized wheel lift mechanism that employ hydraulic actuators to achieve the positioning of structures for support of separated pairs of wheels. The elimination of moving parts in the wheel lift assembly is also advantageous in cold weather, when problems occur with hinges and hydraulics. In extreme cold, hydraulic fluids become more viscous, rendering actuators inoperable or at best, sluggish. Additionally, hinges, pivots and sleeves tend to stick and bind. The present invention minimizes the moving parts and hydraulic actuators required for an effective wheel lift apparatus, making cold temperature operations easier, faster and less troublesome when compared to conventional wheel lift devices.

Less damage to the vehicle is an additional advantage of the manual means for positioning the tire arms as described above for the present invention. Manual means haver a distinct advantage over hydraulically actuated prongs and pincers that often incur damage to the first interior sidewalls and the second interior sidewalls of the vehicle.

According to an aspect of the invention, the tire arms are manually inserted into their respective sockets, allowing the operator direct control over the support of the wheels to be lifted.

According to a related aspect of the present invention, this manual positioning of the tire arms can occur after the carriages are positioned beneath the wheel, providing the operator with additional control over the support of the wheel.

According to another aspect of the invention, the tire arms each include an offset segment. The orientation of the offset segments relative to the carriage allows various diameters of tires to be retained by the wheel lift assembly. Alternate distances between the tire arm pairs can be selected by the operator to best accommodate the wheel diameter of the vehicle to be towed.

The invention has the additional advantage of retaining the wheels of the towed vehicle without employing a powered hinging or separating action that damages the wheeled vehicle to be towed.

Yet another advantage of the invention is that the lift mechanism is especially suited for a retro-fit installation onto a tow truck.

DETAILED DESCRIPTION OF SPECIFIC EMBODIMENTS

Figure 1:
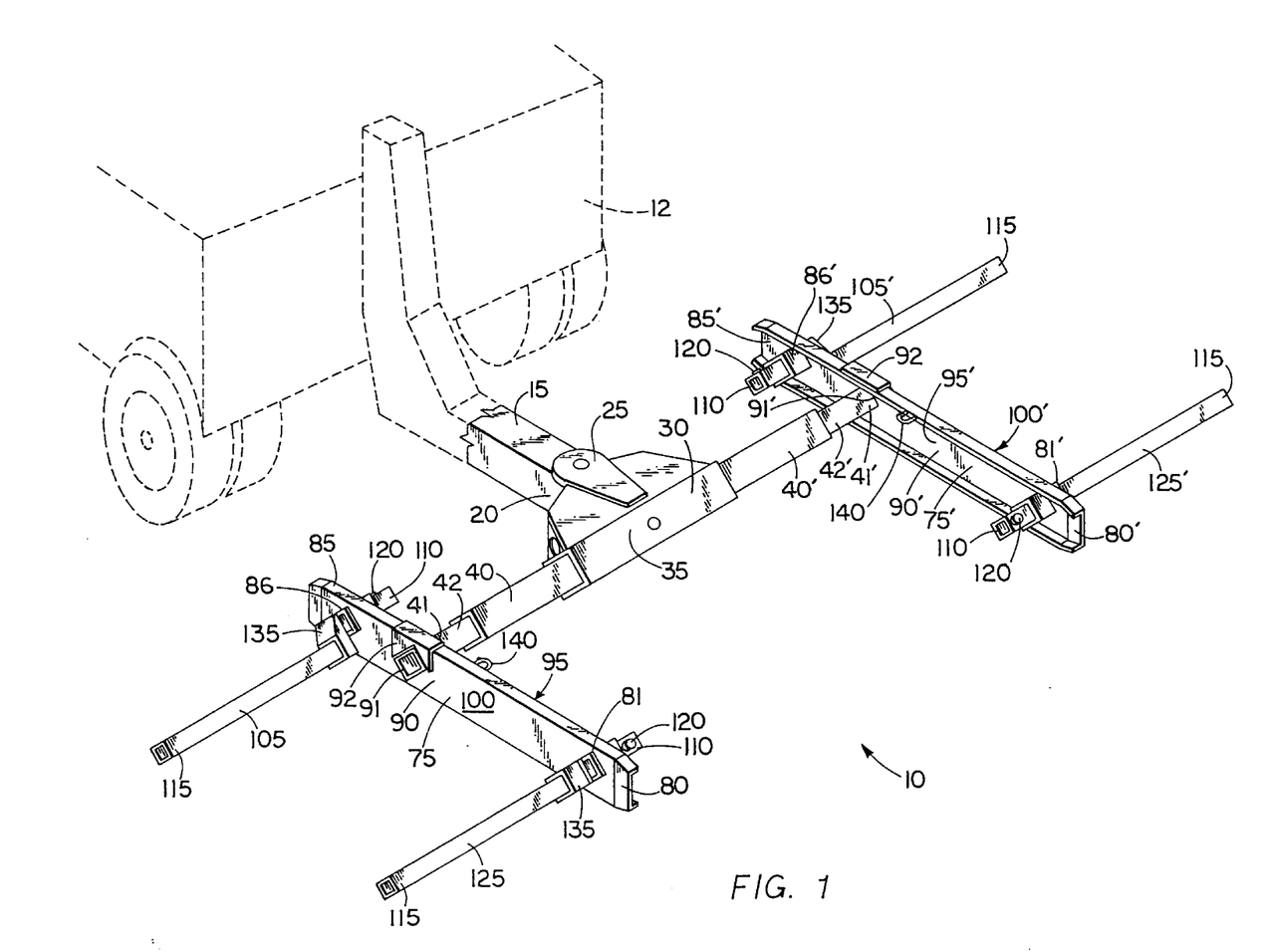
FIG. 1 is a perspective diagram of a vehicle lifting apparatus, according to an embodiment of this invention.
Figure 7:
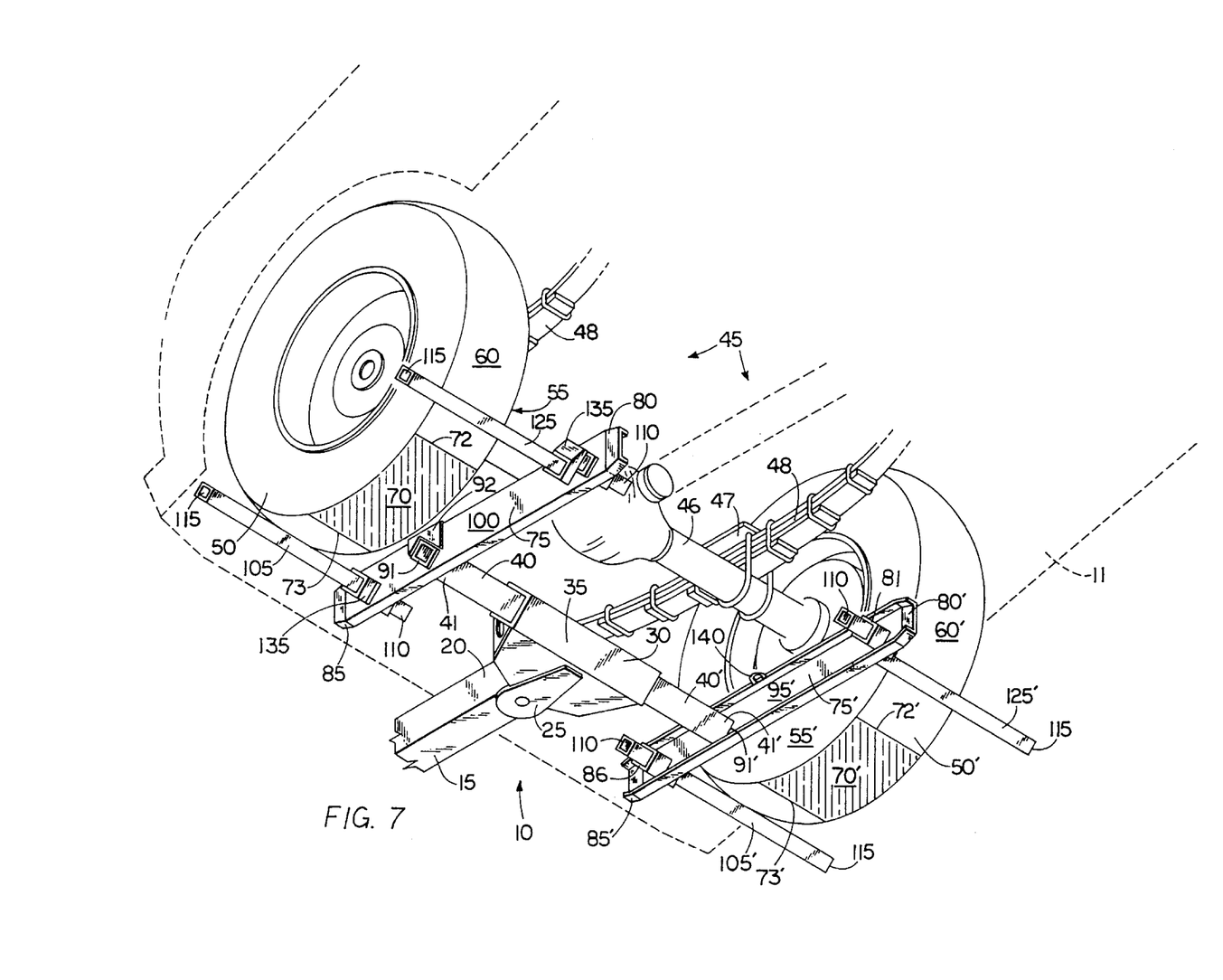
FIG. 7 is a perspective diagram of a vehicle lifting apparatus, according to an embodiment of this invention.

The present invention provides a wheel lift assembly 10, as shown in FIG. 1, for lifting and towing a wheeled vehicle 11, as additionally shown in FIG. 7. The wheel lift assembly is especially suited for a conventional tow vehicle 112, as shown in FIG. 1. The tow vehicle can be any vehicle configured similarly to a common tow truck. The tow vehicle is preferably equipped with a boom 15 that extends from the back of the tow vehicle. The boom can be of many alternative designs known to the vehicle towing industry. The boom can typically be extended, retracted, raised or be lowered, as desired by an operator. Hydraulic actuators (not shown), well know in the industry, are typically utilized to achieve the movements of the boom.

The boom 15 has a tail end 20 which typically includes a connection 25 to a transverse beam 30 at an approximate middle point 35 of the transverse beam. The connection to the transverse beam is typically hinged, allowing the transverse beam to pivot on the tail end of the boom. With the combination of the extendable boom and the pivoting connection, the transverse beam can extend forward, from the back of the tow vehicle 12, or retract, back toward the tow vehicle. The transverse beam can also articulate by being raised, lowered and additionally pivoted about the connection from side to side.

Figure 2:
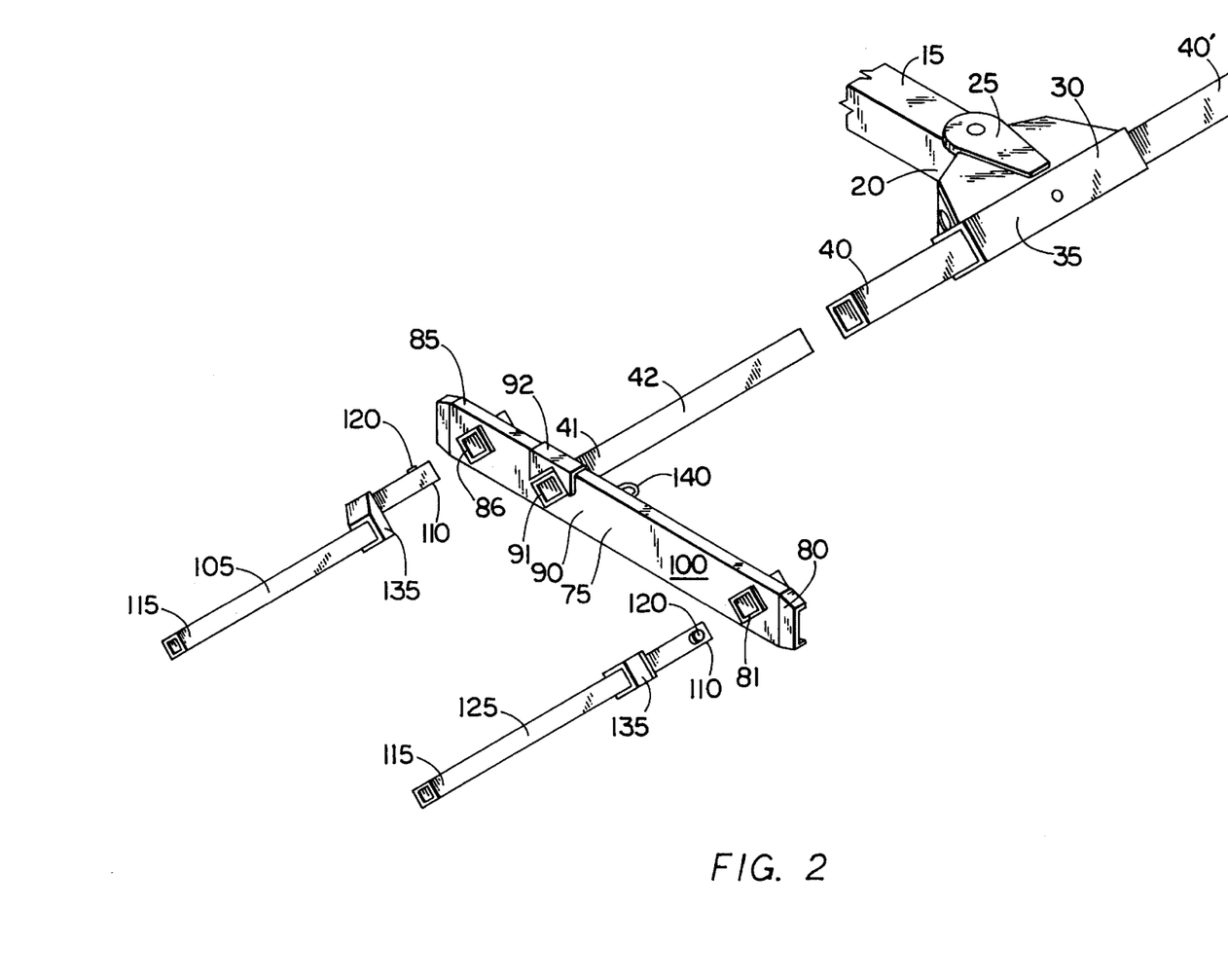
FIG. 2 is a partial perspective diagram of the unassembled vehicle lifting apparatus, according to an embodiment of this invention.

The transverse beam 30 also includes a first end 40 and a second end 40'. The transverse beam can be fabricated from a single length of material or can comprise a sleeve that receives a first leg 42 and a second leg 42' as shown in a preferred embodiment in FIGS. 1 and 2. The wheel lift assembly 10 of the present invention includes a first leg 42 and a second leg 42', as shown in FIGS. 1 and 2. Preferably, the first end 40 of the transverse beam slidably receives the first leg. Correspondingly, the second end 40' of the transverse beam slidably receives the second leg of the wheel lift assembly. The present invention allows the positions of the first leg and the second leg to be manually adjusted, relative to the transverse beam 30. The first leg and second leg can slide respectively within the first end and the second end of the transverse beam, to accommodate a wide range of distances between a pair of opposing wheels 80 and 80', as shown in FIG. 7. Preferably the fist leg and the second leg are affixed and locked to the sleeve to prevent further sliding on the transverse beam. A threaded bolt (not shown), received into a threaded opening (not shown) within the first end and the second end of the transverse beam is the preferred means to lock the respective first leg and second leg in place. The threaded bolt is manually rotatable and engages the respective first leg or the second leg when tightened by an operator, locking each of the respective first leg or second leg in place along the transverse beam.

In a preferred alternate means to lock the first leg 42 and the second leg 42' to the transverse beam 30, the first leg and the second leg each include a leg stop (not shown) on their exterior surface. The leg stop engages one of a plurality of corresponding holes (not shown) when it inserts into the first end 40 and the second end 40' of the transverse beam. A spring (not shown) within the interior space (not shown) of the first leg and the second leg holds the leg stop in position within its corresponding hole, thus preventing the first leg and second leg from sliding while the leg stop is engaged in the corresponding hole. To extend or retract the leg, the operator can manually depress the leg stop while pulling or pushing the respective first leg or second leg until the leg catches into another corresponding hole in the transverse beam, thereby locking the first leg or second leg in position.

Figure 3:
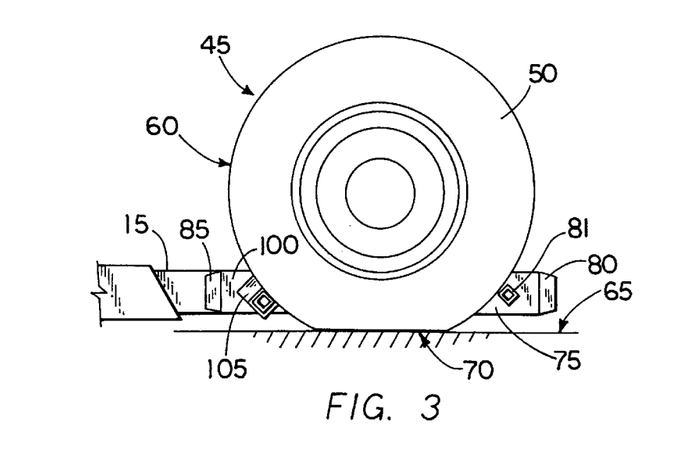
FIG. 3 is a side view of the vehicle lifting apparatus, according to an embodiment of this invention.

With the articulation of the wheel lift assembly 10, provided as described above, the transverse beam 30 has the ability to be positioned beneath a separated pair of wheels 45, as shown in FIG. 3. The separated pair of wheels are typically interconnected by an axle 46, as shown in FIG. 7. As additionally shown in FIG. 7, the axle is conventionally attached with mounts 47 to the understructure 48 of the wheeled vehicle 11. The separated pair of wheels at least include a first wheel 50 and a second wheel 50'. The first wheel may be a set of wheels as typically encountered in dual rear wheel configurations. The second wheel may also be a set of multiple wheels.

The first wheel 50 and the second wheel 50' are considered to be of conventional design, with the first wheel including a first interior facing sidewall 55 and a first tread surface 60. The second wheel includes a second interior facing sidewall 55' and a second tread surface 60'. As observable in FIG. 3, when the first wheel 50 rests upon a ground surface 65, a first ground contact 70 is made on a portion of the first tread surface. Similarly, when the second wheel 50' rests upon a ground surface 65, a second ground contact 70' is made on a portion of the second tread surface.

The first ground contact 70 and the second ground contact 70' are approximately rectangular areas and are shown with shading in FIG. 7. The first ground contact includes a first fore-edge 72 and a first rear-edge 73. Likewise, the second ground contact includes a second fore-edge 72' and a second rear-edge 73'.

To support the pair of separated wheels 45, the transverse beam 30 is fitted with the wheel lift assembly 10. The wheel lift assembly includes a first carriage 75 mounted to the first end 40 of the transverse beam and a second carriage 75' mounted to the second end 40' of the transverse beam. The first carriage has a first forward end 80 that includes a first fore-socket 81, a first rearward end 85 that includes a first rear-socket 86, and a first mid-length 90, formed between the first forward end and the first rearward end. The first carriage also has a first interior face 95 and a first exterior face 100.

Additionally, the first carriage 75 includes a first mid-socket 91 for receiving the first end 41 of the first leg 40. The first mid-socket is preferably square in shape, corresponding to the preferred cross sectional shape of the transverse beam. The first mid-socket is located on the first interior face of the first carriage, along the first mid-length 90. The first interior face is positioned to face the boom 15 and the opposite second carriage 75' that is similarly configured to the first carriage.

As with the first carriage 75, the second carriage 75' has a second forward end 80' that includes a second fore-socket 81', a second rearward end 85' that includes a second rear-socket 86, a second mid-length 90', formed between the second forward end and the second rearward end. The second carriage also has a second interior face 95' and a second exterior face 100'.

Additionally, the second carriage 75' includes a second mid-socket 91' for receiving the second end 41' of the second leg 40'. Like the first mid-socket 91, the second mid-socket is preferably square in shape, corresponding to the preferred cross sectional shape of the transverse beam. The second mid-socket is located on the second interior face 95' of the second carriage, along the second mid-length 90'. Like the similarly configured first carriage 75, the second interior face of the second carriage is positioned to face the boom 15 and the opposite first interior face 95 of the first carriage.

The first end 41 of the first leg 42 is preferably welded to the first mid-socket 91. Likewise, the second end 41' of the second leg 42' is preferably welded to the second mid-socket 91'. A reinforcing plate 92 can also be added surrounding the upper portion of the first mid-socket and the second mid-socket, as preferred, to reinforce the respective first mid-socket or second mid-socket. The reinforcing plate is preferably welded to the respective first carriage 75 or the second carriage 75'.

The first rear-socket 86, located on the first exterior face 100, proximate the first rearward end 85 of the first carriage 75, can receive a first rear-arm 105. The first rear-arm includes an inserted end 110, and a free end 115. The first rear-arm is manually insertable into and manually removable from the first rear-socket. The first rear-arm also preferably includes an arm stop 120. The arm stop is located proximate the inserted end.

Similarly, the second rear-socket 86', located on the second exterior face 100', proximate the second rearward end 85' of the second carriage 75', can receive a second rear-arm 105'. Like the first rear-arm 86, the second rear-arm includes an inserted end 110 and a free end 115. The second rear-arm is manually insertable into and manually removable from the second rear-socket. The second rear-arm also preferably includes an arm stop 120. Again, the arm stop is located proximate the inserted end. This manual means for manually inserting the first rear-arm into the first rear-socket of the first carriage and manually inserting the second rear-arm into the second rear-socket of the second carriage is an improvement over mechanically powered means for achieving wheel lifts as conventionally practiced in the industry.

As previously discussed, the articulated transverse beam 30 can be positioned beneath the vehicle 11 to be towed. This articulation of the transverse beam provides a positioning means for positioning the first carriage 75 proximate the first interior facing sidewall 55 of the first wheel 50, and for positioning the second carriage 75' proximate the second interior facing sidewall 55' of the second wheel 50'. Preferably, the first rear-arm 105 and the second rear-arm 105' are already inserted into the respective first rear-socket 86 and second rear-socket 86', prior to positioning the first carriage proximate the first interior facing sidewall of the first wheel, and prior to positioning the second carriage proximate the second interior facing sidewall of the second wheel. The position of the first rear-arm and the second rear-arm can be manually adjusted by removing and reinserting it after the positioning of the first carriage and the second carriage; alternatively, the first rear-arm and the second rear-arm may be manually inserted after the manual positioning of the first carriage and the second carriage.

As shown in FIGS. 3 and 7, the first rear-arm 105 is preferably positioned proximate the first rear-edge 73 of the first ground contact 70 of the first wheel 50; the second rear-arm 105' is similarly positioned proximate the second rear edge 73' of the second ground contact 70' of the second wheel 50.

With the first carriage arm 75 located beneath the vehicle 11 as described above, a first fore-arm 125 can be manually inserted into the first fore-socket 81 that is located on the first exterior face 100, proximate the first forward end 80 of the first carriage 75. Similarly, after the second carriage arm 75' is located beneath the vehicle, a second forearm 125' can be manually inserted into the second fore-socket 81' that is located on the second exterior face 100', proximate the second forward end 80' of the second carriage 75'.

Preferably, the first carriage and the second carriage are first located beneath the vehicle 11 by the tow lift operator, with or without the first rear-arm 105 already inserted into the first rear-socket 86' of the first carriage 75' and the second rear-arm 105' already inserted into the second rear-socket 86' of the second carriage 75'. Alternatively, the operator can insert the first rear-arm or the second rear-arm or adjust them after the first carriage and second carriage are located beneath the vehicle. After the first carriage and second carriage are in position, the operator can insert the first fore-arm 125 into the first fore-socket 81 of the first carriage arm 75 and similarly, the second fore-arm 125' into the second fore-socket 81' of the second carriage arm 75'.

Figure 4:
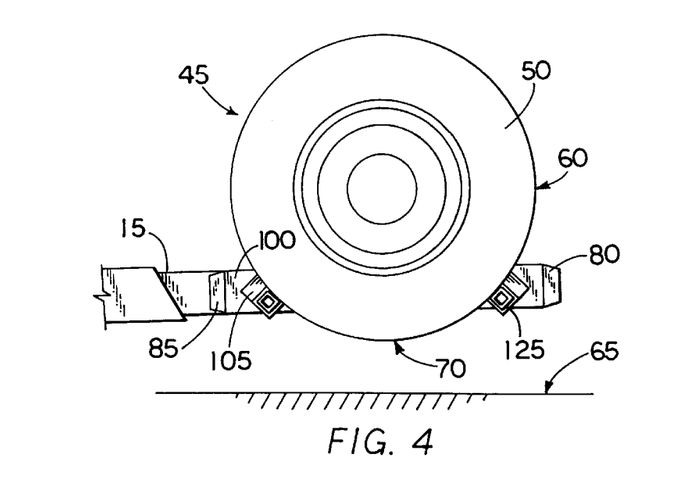
FIG. 4 is a side view of the vehicle lifting apparatus, according to an embodiment of this invention.

In the present invention, the first fore-arm 125 is preferably positioned proximate the first fore-edge 72 of the first ground contact 70. Likewise, the second fore-arm 125' is preferably positioned proximate the second fore-edge 72' of the second ground contact 70. The separated pair of wheels 45 of the towed vehicle can now be lifted, fully supported by the wheel lift assembly 10, as shown in FIGS. 4 and 7.

When the boom of the tow vehicle 12 and its attached transverse bar 30 and wheel lift assembly 10 is lifted, the first fore-arm 125 and the first rear-arm 105 of the first carriage 75 together support the first wheel 50 of the separated pair of wheels 45. Likewise, the second fore-arm 125' and the second rear-arm 105' of the second carriage 75' together are able to support the second wheel 50' of the separated pair of wheels when the boom and attached transverse bar and wheel lift assembly are raised.

The conventional means for lifting the transverse bar 30 include powered means, such as hydraulic actuators, electromechanical servos or winches. The lifting means begins with the transverse bar located proximate the ground surface 65. Typically, the transverse bar is actually resting on the ground surface. The lifting means raises the transverse bar, and the attached first carriage 75, which was previously located proximate the first fore-edge 72 of the first ground contact 70, thereby contacting the first fore-arm 125 to the first tread surface 60 of the first wheel 50. Additionally, the lifting means contacts the first rear-arm 105, which was previously located proximate the first rear-edge 73 of the first wheel.

Similarly, the lifting means also raises the transverse bar 30 and the attached second carriage 75', which was previously located proximate the second fore-edge 72' of the second wheel's second ground contact 70', thereby contacting the second tread surface 60' of the second wheel 50' with the second fore-arm 125'. Also additionally, the lifting means contacts the second rear-arm 105', which was previously located proximate the second rear-edge 73' of the second wheel. The lifting means further raises the transverse bar to lift the separated pair of wheels 45 and the attached vehicle 11.

Figure 5:
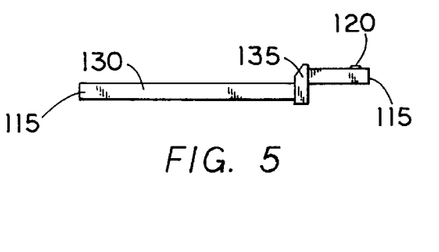
FIG. 5 is a side view of a tire arm, according to an embodiment of the present invention.
Figure 6:
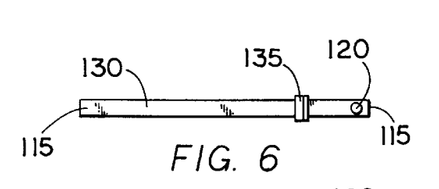
FIG. 6 is a top view of the tire arm, according to an embodiment of the present invention.

The first fore-arm 125 the first rear-arm 105, the second fore-arm 125' and the second rear-arm 105' are preferably approximate replications of each other, thereby allowing them to be interchangeably employed in the present invention, and will be referred collectively herein as tire arms 130, as shown in FIGS. 5 and 6. This is another convenient feature of the present invention. An operator need not search for a specific tire arm for a specific socket. Additionally, replacement of damaged or lost tire arms is a simple mater that does not require the manufacture and stocking of four different variations of tire arms for replacements.

A typical tire arm 130 as shown in FIG. 7, is preferably fabricated with a transitional offset 135 in the length of the arm. The offset is preferably located proximate the inserted end 110 of the tire arm, additionally positioned to abut the first exterior face 100 or the second exterior face 100' of the respective first carriage 75 or second carriage 75', depending on which carriage the tire arm is inserted.

Similarly, the first fore-socket 81, the first rear-socket 86, the second fore-socket 81' and the second rear-socket 86' are approximately the same cross-sectional shape and diameter, thereby allowing each to receive the same cross sectionally shaped tire arm 130, and will be referred collectively herein as sockets. Each of the tire arms preferably has a square cross-section to allow insertion with alternative orientations.

The offset 135 allows the tire arms 130 to accommodate separated pairs of wheels 45 with differing wheel diameters. Preferably the offset is approximately between 1 and 6 inches, and most preferably, approximately three inches. Prior to inserting one of the tire arms into one of the sockets, the operator can select the appropriate orientation of the tire arm to best accommodate the wheel diameter. As previously discussed, this ability to manually insert the tire arm after the first carriage 75 and the second carriage 75' are positioned beneath the vehicle 11 to be towed is another distinct advantage of the present invention.

The manual selection of the proper orientation of the tire arms 130 is a quick and simple operation. To prevent the tire arms from slipping out of their respective sockets, each of the tire arms is preferably equipped with an arm stop 120. Each arm stop is preferably spring loaded. A spring (not shown) located within the tie arm and forces the arm stop to protrude from the tire arm and maintains pressure on the arm stop, thereby preventing the tire arm from moving into or out of the socket. The arm stops prevent each of the tire arms from being removed, once inserted into the socket. When the operator desires to remove or insert a tire arm into a socket, the operator depresses the arm stop while pushing or pulling the tire arm.

The manual insertion of tire arms 130 such as the first rear-arm 105 or the second rear-arm 105' into their respective first rear-socket 86 or second rear socket 86' is easily achieved by the operator of the tow vehicle 12 without powered means, such as hydraulic actuators, electric winches or servos. This results in a configuration that is less expensive to build, maintain and operate. Further, the operator can refine the tire arm 130 position by choosing among four possible orientations of each tire arm relative to the receiving sockets, resulting in sixteen possible combinations to accommodate the first wheel 50 or the second wheel 50', independent from each other.

The ability to manually adjust all four the tire arms 130 while the first carriage 75 and he second carriage 75' are already positioned beneath the vehicle 11 is a feature absent in prior lift mechanisms. Specifically, the U.S. Pat. No. 4,473,334 to Brown relies upon the hydraulic separation of pronged claws to engage the wheels of the towed vehicle. Such an automated structure is entirely absent in the present device. Brown '334 teaches the angled insertion of the prongs into the claw to prevent longitudinal displacement under load. The present invention does not require this angled insertion because without hydraulic actuation under load, the angled insertion as taught by Brown '334 is no longer required to prevent longitudinal displacement of the vehicle. Instead, the arm stops 120 of the present invention, as described above, are adequate to prevent the tire arms from disengaging under load. The present invention's manual insertion of the tire legs is not a substitute for the structure or locating means taught by Brown '334.

In the present invention, to ensure that the separated pair of wheels 45 of the towed vehicle 11 do not disengage in transit, the operator can secure the vehicle to the wheel lift assembly 10. An anchor loop 140 is provided on each of the first mid-length 90 of the first carriage 75 and the second mid-length 90' of the second carriage 75', as shown in FIGS. 1 and 7. A cable or chain (not shown) is easily connected or routed through the anchor loop, then connected or routed through the understructure 48 or around the axle 46 of the vehicle.

Tow vehicles 12 are typically retrofitted with the carriage assembly 10 of the present invention. The first leg 42 and the second leg 42' are preferably fabricated to fit into the tow vehicle's existing transverse beam 30.

In compliance with the statutes, the invention has been described in language more or less specific as to structural features and process steps. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible which employ the same inventive concepts as described above. Therefore, the foregoing description should not be taken as limiting the scope of the invention which is defined by the claims that follow.

What is claimed is:

1. An apparatus for lifting and towing a wheeled vehicle comprising:

a transverse beam articulatably mountable to a tow vehicle, the transverse beam having a first end and a second end, the transverse beam able to be positioned beneath a separated pair of wheels, the separated pair of wheels attached to a vehicle and at least comprising a first wheel and a second wheel, the first wheel including a first interior facing sidewall and a first tread surface, and the second wheel including a second interior facing sidewall and a second tread surface;

a first portion of the first tread surface in contact with a ground surface to form a first ground contact, the first ground contact having a first fore-edge and a first rear-edge;

a second portion of the second tread surface in contact with the ground surface to form a second ground contact, the second ground contact having a second fore-edge and a second rear-edge;

a first carriage having a first forward end, a first rearward end and a first mid-length therebetween, a first fore-socket, a first mid-socket, a first rear-socket, a first interior face and a first exterior face, the first fore-socket located on the first exterior face proximate the first forward end of the first carriage, the first mid-socket located on the first interior face proximate the first mid-length of the first carriage, the first rear-socket located on the first exterior face proximate the first rearward end of the first carriage, the first end of the transverse beam mountable into the first mid-socket of the first carriage, and the first carriage positionable proximate the first interior facing sidewall of the first wheel;

a second carriage having a second forward end, a second rearward end and a second mid-length therebetween, a second fore-socket, a second mid-socket, a second rear-socket, a second interior face and a second exterior face, the second fore-socket located on the second exterior face proximate the second forward end of the second carriage, the second mid-socket located on the second interior face proximate the second mid-length of the second carriage and the second rear-socket located on the second exterior face proximate the second rearward end of the second carriage, the second end of the transverse beam mountable into the second mid-socket of the second carriage, and the second carriage positionable proximate the second interior facing sidewall of the second wheel;

a first fore-arm, manually insertable into the first fore-socket;

a first rear-arm, manually insertable into the first rear-socket, and the first-rear arm manually positionable proximate the first rear-edge of the first ground contact;

a second fore-arm, manually insertable into the second fore-socket;

a second rear-arm, manually insertable into the second rear-socket, the second rear arm manually positionable proximate the second rear-edge of the second ground contact, and the transverse bar liftable to contact the first tread surface of the first wheel with the first fore-arm proximate the first fore-edge and with the first rear-arm proximate the first rear-edge, to contact the second tread surface with the second fore-arm proximate the second fore-edge and with the second rear-arm proximate the second rear-edge, and for further raising the transverse bar to lift the separated pair of wheels and the attached vehicle; and the first fore-arm, the first rear-arm, the second fore-arm and the second rear-arm all include offsets and are manually removable, manually rotatable and manually reinsertable into the respective first fore-socket, the first rear-socket, the second fore-socket and the second rear-socket, to accommodate the support of wheels of various diameters.

2. The vehicle lifting and towing apparatus of claim 1, wherein the first fore-arm, the first rear-arm, the second fore-arm and the second rear-arm are interchangeable and approximately identical.

3. A method for lifting and towing a wheeled vehicle comprising:
 a) articulatably mounting a transverse beam to a tow vehicle, the transverse beam having a first end and a second end;
 b) positioning the transverse beam beneath a separated pair of wheels, the separated pair of wheels attached to a vehicle and at least comprising a first wheel and a second wheel, the first wheel including a first interior facing sidewall and a first tread surface, and the second wheel including a second interior facing sidewall and a second tread surface, a first portion of the first tread surface in contact with a ground surface to form a first ground contact, the first ground contact having a first fore-edge and a first rear-edge, a second portion of the second tread surface in contact with the ground surface to form a second ground contact, the second ground contact having a second fore-edge and a second rear-edge;
 c) positioning a first carriage proximate the first interior facing sidewall of the first wheel, the first carriage having a first forward end, a first rearward end and a first mid-length therebetween, a first fore-socket, a first mid-socket, a first rear-socket, a first interior face and a first exterior face, the first fore-socket located on the first exterior face proximate the first forward end of the first carriage, the first mid-socket located on the first interior face proximate the first mid-length of the first carriage, the first rear-socket located on the first exterior face proximate the first rearward end of the first carriage, the first end of the transverse beam mountable into the first mid-socket of the first carriage, and the first carriage including a first fore-arm manually insertable into the first fore-socket;
 d) positioning a second carriage proximate the second interior facing sidewall of the second wheel, the second carriage having a second forward end, a second rearward end and a second mid-length therebetween, a second fore-socket, a second mid-socket, a second rear-socket, a second interior face and a second exterior face, the second fore-socket located on the second exterior face proximate the second forward end of the second carriage, the second mid-socket located on the second interior face proximate the second mid-length of the second carriage and the second rear-socket located on the second exterior face proximate the second rearward end of the second carriage, the second end of the transverse beam mountable into the second mid-socket of the second carriage, and the second carriage including a second fore-arm manually insertable into the second fore-socket;
 e) manually positioning the first-rear arm proximate the first rear-edge of the first ground contact;
 f) manually inserting a first rear-arm into the first rear-socket:
 g) manually positioning the second rear arm proximate the second rear-edge of the second ground contact;
 h) manually inserting a second rear-arm into the second rear-socket,
 i) lifting the transverse bar to contact the first tread surface of the first wheel with the first fore-arm proximate the first fore-edge and with the first rear-arm proximate the first rear-edge, and to contact the second tread surface with the second fore-arm proximate the second fore-edge and with the second rear-arm proximate the second rear-edge; and
 j) further raising the transverse bar to lift the separated pair of wheels and the attached vehicle.

* * * * *